US005724239A

United States Patent [19]
Kaneko

[11] Patent Number: 5,724,239
[45] Date of Patent: Mar. 3, 1998

[54] ROBUST CONTROL SYSTEM FOR DESIGNING LOGIC FOR IMPERFECT MODEL

[75] Inventor: Junji Kaneko, Kawasaki, Japan

[73] Assignee: Fujitsu Limited, Kawasaki, Japan

[21] Appl. No.: 548,466

[22] Filed: Oct. 26, 1995

[30] Foreign Application Priority Data

Oct. 27, 1994 [JP] Japan .................................. 6-263526

[51] Int. Cl.$^6$ .............................. G05B 13/00; G05B 13/04
[52] U.S. Cl. ............................................. 364/149; 364/148
[58] Field of Search ........................... 364/149, 152, 364/151, 150, 156, 164, 165, 148; 318/561

[56] References Cited

U.S. PATENT DOCUMENTS

| | | | |
|---|---|---|---|
| 4,663,703 | 5/1987 | Axelby et al. | 364/149 |
| 4,719,561 | 1/1988 | Shigemasa | 364/148 |
| 4,769,766 | 9/1988 | Tung | 364/149 |
| 5,132,897 | 7/1992 | Allenberg | 364/149 |
| 5,329,442 | 7/1994 | Moshfegh | 364/149 |
| 5,335,164 | 8/1994 | Gough, Jr. et al. | 364/149 |

OTHER PUBLICATIONS

Lam et al., "Investigation of Robust Model-Following Using a Two-Layered Compensation Scheme", Proceedings of the 31st Conference on Decision and Control, pp. 557–559 Dec. 1992.

Smith et al., "Model Validation: A Connection Between Robust Control and Identification", IEEE Transactions on Automatic Control, vol. 37, No. 7, pp. 942–952 Jul. 1992.

Kang et al., "A Robust Adaptive Controller for Rigid Robots", Proceedings of the 28th Conference on Decision and Control, pp. 2619–2620 Dec. 1989.

Chen et al., "Robust Hybrid Control of Robot Manipulators", Robotics and Automation, 1989 IEEE International Conference, pp. 236–241 1989.

Kaneko et al., "Model Control of Flexible One-Link Arms with Random Disturbances", Proceedings of the 28th Conference on Decision and Control, pp. 2141–2146 Dec. 1989.

Khargonekar et al., "Filtering and Smoothing in an H Setting", Proceedings of the 28th Conference on Decision and Control, pp. 415–420 Dec. 1989.

Johansson, "Quadratic Optimization of Motion Coordination and Control", Robotics and Automation, 1990 IEEE International Conference, pp. 1204–1209 1990.

*Primary Examiner*—Emanuel T. Voeltz
*Assistant Examiner*—Tony M. Cole
*Attorney, Agent, or Firm*—Armstrong, Westerman, Hattori, McLeland & Naughton

[57] ABSTRACT

A robust control apparatus for controlling an object corresponding to a robust control theory. A control model generating unit generates an object to be controlled, such as a dynamics model of a robot. In this model, both an error in each of the true values of coefficient matrices and noise are considered. When a corrected partial input of a selective partial input is considered, the generated dynamics model can be treated as a standard probability system model. When the partial input is optimized corresponding to the robust quadratic optimizing criterion, an optimized partial input can be obtained. The object is controlled corresponding to the optimized partial input and the output of the control model generating unit. Thus, in consideration of both the modeling error and the influence of the random disturbances, the robust quadratic optimization can be performed.

27 Claims, 11 Drawing Sheets

ROBUST CONTROL SYSTEM FOR DESIGNING LOGIC FOR IMPERFECT MODEL

BACKGROUND OF THE INVENTION

1. Field of the Invention

The present invention relates to a robust control system that is a control system designing logic that accepts an imperfect model. In particular, the present invention relates to a robust control apparatus for performing a tracking control of a robot corresponding to a more precise dynamics model considering the inaccuracies of coefficient matrices that represent dynamic characteristics of the robot and the influence of a random input.

2. Description of the Related Art

In designing a control system, a dynamics model is designed corresponding to a control theory for an object to be controlled. The designed result is then used for the object.

The object is a real apparatus or a real machine in the real world. The object is associated with a control theory as a general logical system.

When the dynamics model of the object can be precisely constructed, the control system can be designed by a standard designing method, which does not depend on the designer, corresponding to the model and the design specifications.

Next, a robot tracking control for a robot as an example of such a control system design will be described.

FIG. 1 is a block diagram showing the construction of a robot system that executes a tracking control. In FIG. 1, a tracking control apparatus 2 generates an input torque $\tau$ that causes a track $q(t)$ of a robot manipulator to follow predetermined track (target track) $g_r(t)$, and outputs it to a robot 1 so as to perform a tracking control. The robot 1 sends a joint angular vector $q$ and a joint angular rate vector $\dot{q}$ to the tracking control apparatus 2 through respective sensors. A track generator 3 generates a target joint angular vector $q_d$, a target joint angular rate vector $\dot{q}_r$, and a target joint angular acceleration vector $\ddot{q}$ and sends them to the tracking control apparatus 2.

In FIG. 1, when the robot 1 has n links, the dynamic characteristics thereof can be expressed by the following mathematical model (equation (1)).

$$M(q)\ddot{q}+C(q,\dot{q})\dot{q}+G(q)=\tau \quad (1)$$

where $q$ is a n-dimensional joint variable (joint angle); $\dot{q}$ is a joint angular velocity; and $\ddot{q}$ is a joint angular acceleration; $M(q)$ is the n×n inertia matrix; $C(q,\dot{q})\dot{q}$ is an n-dimensional vector that defines the influence of Coriolis and centrifugal force; $G(q)$ is an n-dimensional vector that defines the influence of gravity; and $\tau$ is a n-dimensional vector that defines an input torque supplied from an actuator.

A related art reference of such a robot tracking control has been disclosed in, for example, the following reference.

Reference 1) Johansson, R., "Quadratic optimization of motion coordination and control", IEEE Trans. AC-35, No. 11, pp. 1197–1208, 1980.

According to this related art reference, part of the control torque $\tau(t)$ is composed of a selective input $u(t)$ according to the following equation (2).

$$u(t) = [M(q)\ C(q,\dot{q})] \begin{bmatrix} \dot{z}_1(t) \\ z_1(t) \end{bmatrix} \quad (2)$$

The vectors and matrices in equation (2) are defined as the following equation (3)

$$z(t)=[z_1^T(t)\ z_2^T(t)]^T=T_0\ x(t)$$

$$x(t) = \begin{bmatrix} q_e(t) \\ \dot{q}_e(t) \end{bmatrix} = \begin{bmatrix} q(t)-q_r(t) \\ \dot{q}(t)-\dot{q}_r(t) \end{bmatrix},\ T_0 = \begin{bmatrix} T_{11} & T_{12} \\ 0 & I \end{bmatrix} \quad (3)$$

Each of $z_1$, $z_2$, and so forth is expressed by a transform matrix $T_0$ as follows.

The transform matrix $T_0$ is a 2n×2n matrix. $T_{11}$ and $T_{12}$ are the n×n upper portions of n×n $T_0$. I is the n dimension unit matrix, in other words, a variable $z_2$ is defined so that the transform matrix $T_0$ becomes a square matrix.

$$z_1=T_{11}(\dot{q}-\dot{q}_r)+T_{12}(q-q_r),\ z_2=q-q_r$$

$$\dot{z}_1=T_{11}(\ddot{q}-\ddot{q}_r)+T_{12}(\dot{q}-\dot{q}_r)$$

where $q_e=q-q_r$ is a joint angular error and $\dot{q}_e=\dot{q}-\dot{q}_r$ is an angular velocity error.

When the selective input u(t) is used, an input torque that accomplishes tracking control with the minimum of energy can be easily achieved. In other words, an optimum regulator method that minimizes a quadratic evaluation function can be employed.

In the conventional control apparatus, a control system is designed on the assumption that an accurate dynamics model for an object to be controlled can be generated. FIG. 2 is a block diagram showing the construction of a conventional control apparatus. In FIG. 2, a control apparatus C is used corresponding to an accurate dynamics model P of the robot. Data obtained through a sensor from an object to be controlled 4 corresponding to the model P is input to a controller 5. An control input from the controller 5 is sent to the object 4.

A modeling (system formulating) process for constructing a model of an object to be controlled is mainly performed on a trial and error basis or through experience. Thus, the object is laboriously modeled. In addition, there is always a difference between the resultant model and the real object. The difference between the theory and the model is not a problem intrinsic to control engineering. However, even if a model with a high accuracy is generated, it is still only an approximation of the real object to be controlled. Due to the inaccuracies of the model, when even a controller is designed corresponding to the model is used, the resultant control system becomes unstable.

When a robot is considered as an object to be controlled, it is a moving machine that is a complex construction of a large number of elements. Generally, a model of a robot is a simple representation based on physics. However, the robot is a complicated machine that is beyond such a simple representation thereof. The robot includes a large number of indefinite elements that cannot be accurately calculated. In other words, the robot operates by exchanging materials and energy with the environment. Thus, the robot is affected by deteriorates with time and unexpected external environmental changes. Consequently, even if the user of the robot has sufficient engineering knowledge, he cannot completely know the characteristics thereof and predict variations that will take place.

It is difficult to accurately formulate the values of the coefficient matrix $M(q)$, $C(q,\dot{q})\dot{q}$, and $G(q)$ of the equation (1) for a model of a robot. In addition, even if the robot is controlled corresponding to the formulated model, the desired performance may not be obtained due to influences from random external disturbances such as noise.

As described above, generally it is assumed that the values of the coefficient matrix $M(q)$, $C(q, \dot{q})\dot{q}$, and $G(q)$ are accurately formulated. Thus, inaccuracies of the model are not considered. Moreover, control apparatuses that consider modeling errors and the influences of external inputs have been proposed. However, a robust control apparatus that considers both the modeling error and random disturbances such as noise has not yet been proposed.

SUMMARY OF THE INVENTION

An object of the present invention is to provide a robust control apparatus corresponding to a robust control system that has a design theory that permits the use of an imperfect model in consideration of the inaccuracies of a dynamics model and random disturbances such as noise.

FIG. 3 is a block diagram showing the theoretical construction of a robust control apparatus that considers both a modeling error and random disturbances such as noise.

In FIG. 3, a control model generating unit 11 generates a dynamics model of an object to be controlled 10 in consideration of the inaccuracy of the coefficient matrixes described in the equation (1) and the random disturbances.

A partial input optimizing unit 12 performs a robust quadratic optimization for a selective partial input of a control input for a dynamics model corresponding to the state of the object to be controlled 10 that is supplied as an output of, for example, a sensor. The selective partial input is a general quantity of kinetic energy and is an optimized portion that is extracted from the total control torque.

A control signal generating unit 13 generates a control signal for the object to be controlled 10 corresponding to the outputs of the control model generating unit 11 and the partial input optimizing unit 12.

According to the present invention, the control model generating unit 11 generates an object to be controlled 10, such as a dynamics model of a robot. In this model, both an error in each of the true values of the above-described coefficient matrices and the noise are considered.

When a corrected partial input of a selective partial input as disclosed in the above-described related art reference is considered, the generated dynamics model can be treated as a standard probability system model. When the partial input is optimized corresponding to the robust quadratic optimizing criterion, an optimized partial input can be obtained.

The object 10 is controlled corresponding to the optimized partial input and the output of the control model generating unit 11.

Thus, according to the present invention, in consideration of both the modeling error and the influence of the random disturbances, the robust quadratic optimization can be performed.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Figure 2:
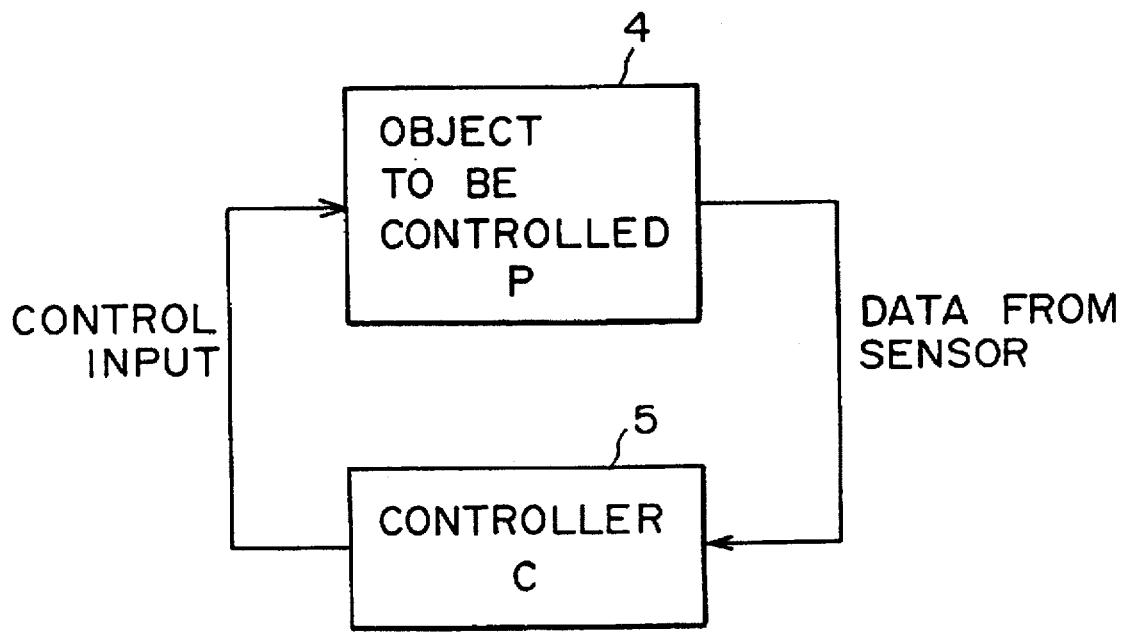
FIG. 2 is a block diagram showing a basic construction of a conventional control apparatus.
Figure 3:
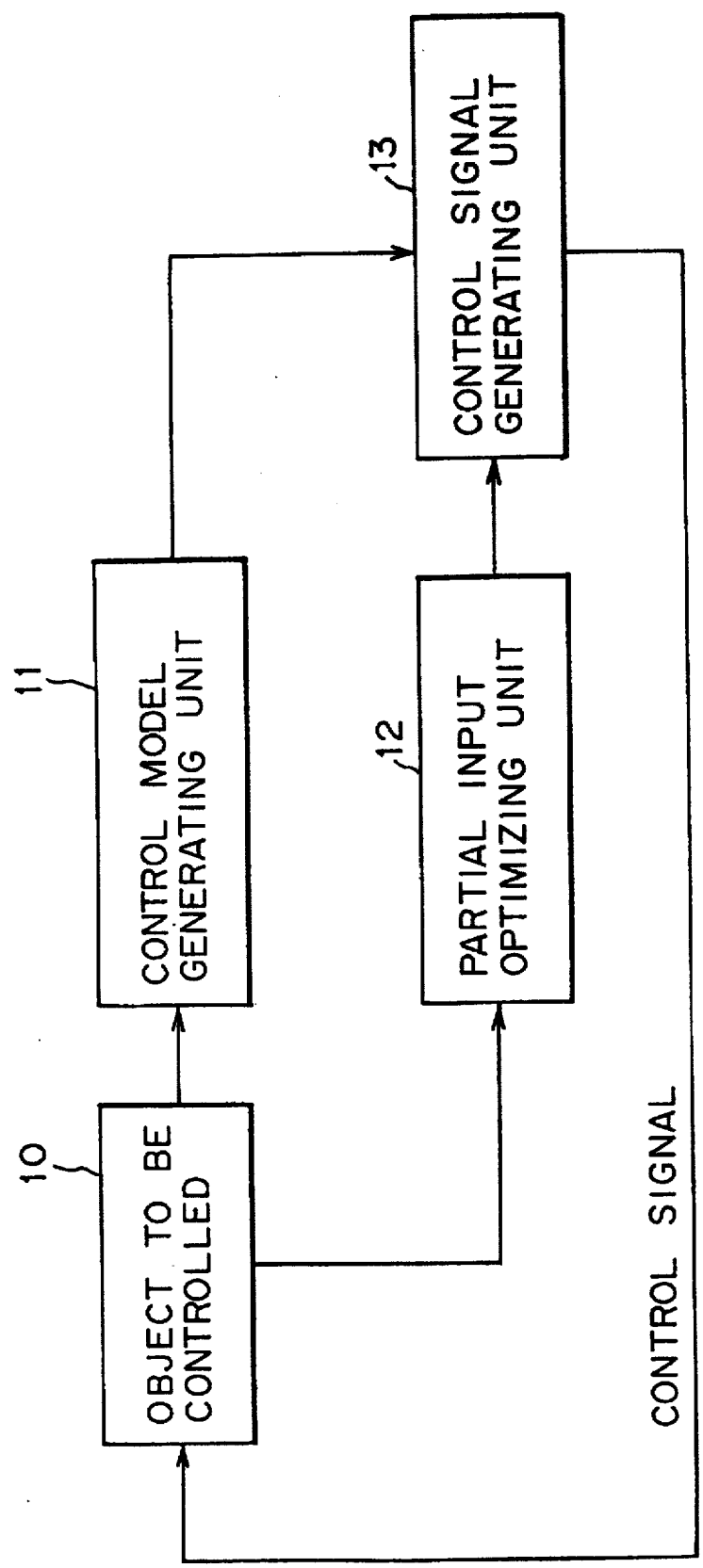
FIG. 3 is a block diagram showing a theoretical construction of the present invention.
Figure 4:
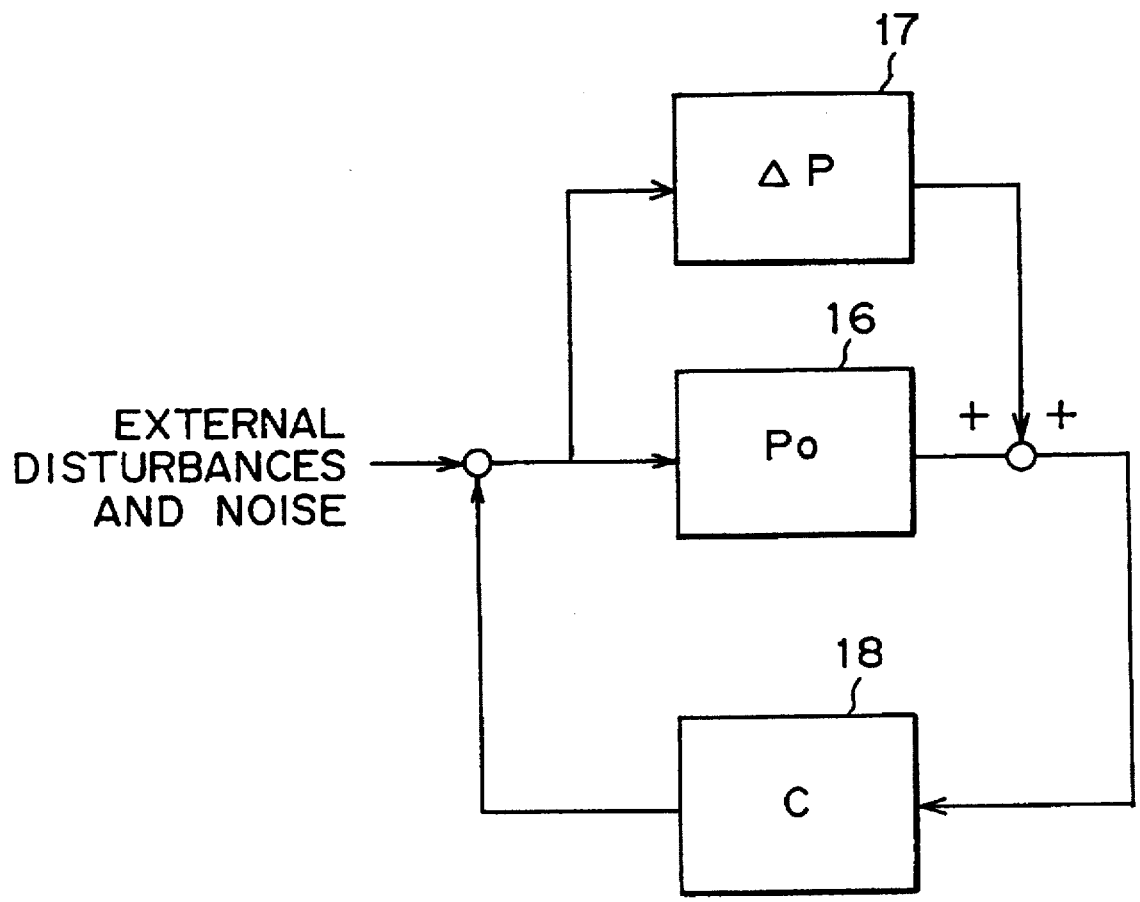
FIG. 4 is a block diagram for explaining the concept of a robust control apparatus according to the present invention.

FIG. 4 shows the concept of a robust control apparatus according to the present invention. Unlike with the example shown in FIG. 2, an object to be controlled is constructed of a dynamics model $P_0$ 16 corresponding to designed parameters, a $\Delta P$ 17 that represents an error between the real dynamics model and the dynamics model $P_0$ 16, and a controller C 18. According to the present invention, even if $\Delta P$ and external disturbance noise are present, the object can be properly controlled.

Figure 1:
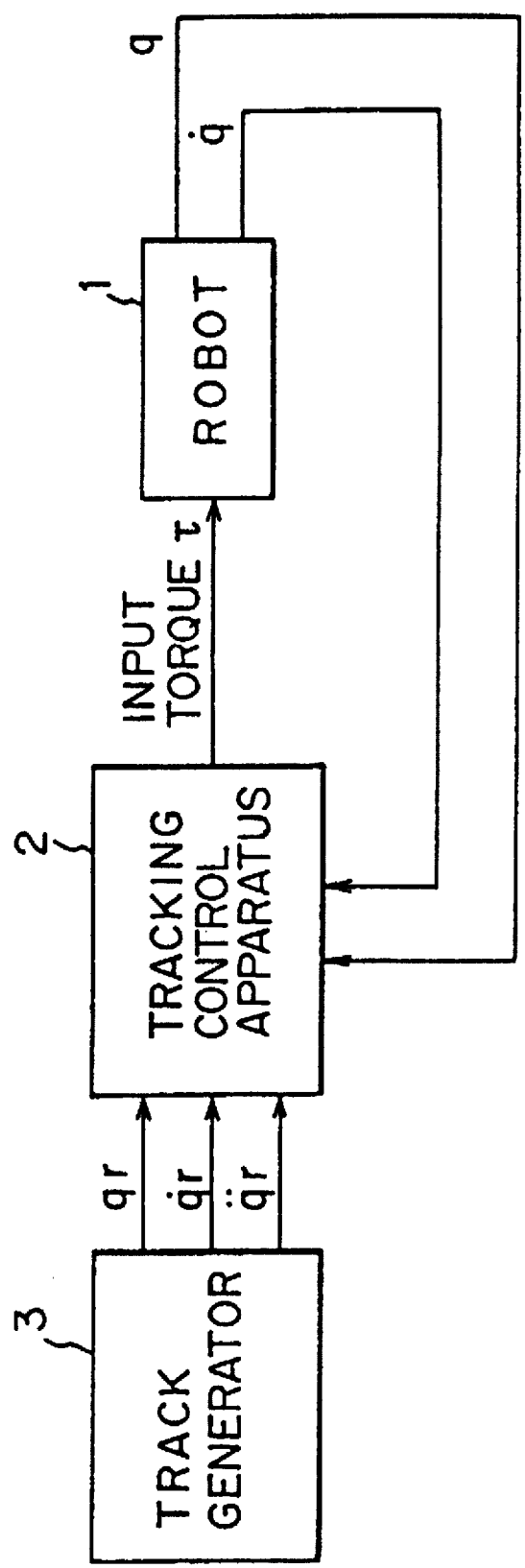
FIG. 1 is a block diagram showing a control system of a tracking control.
Figure 5:
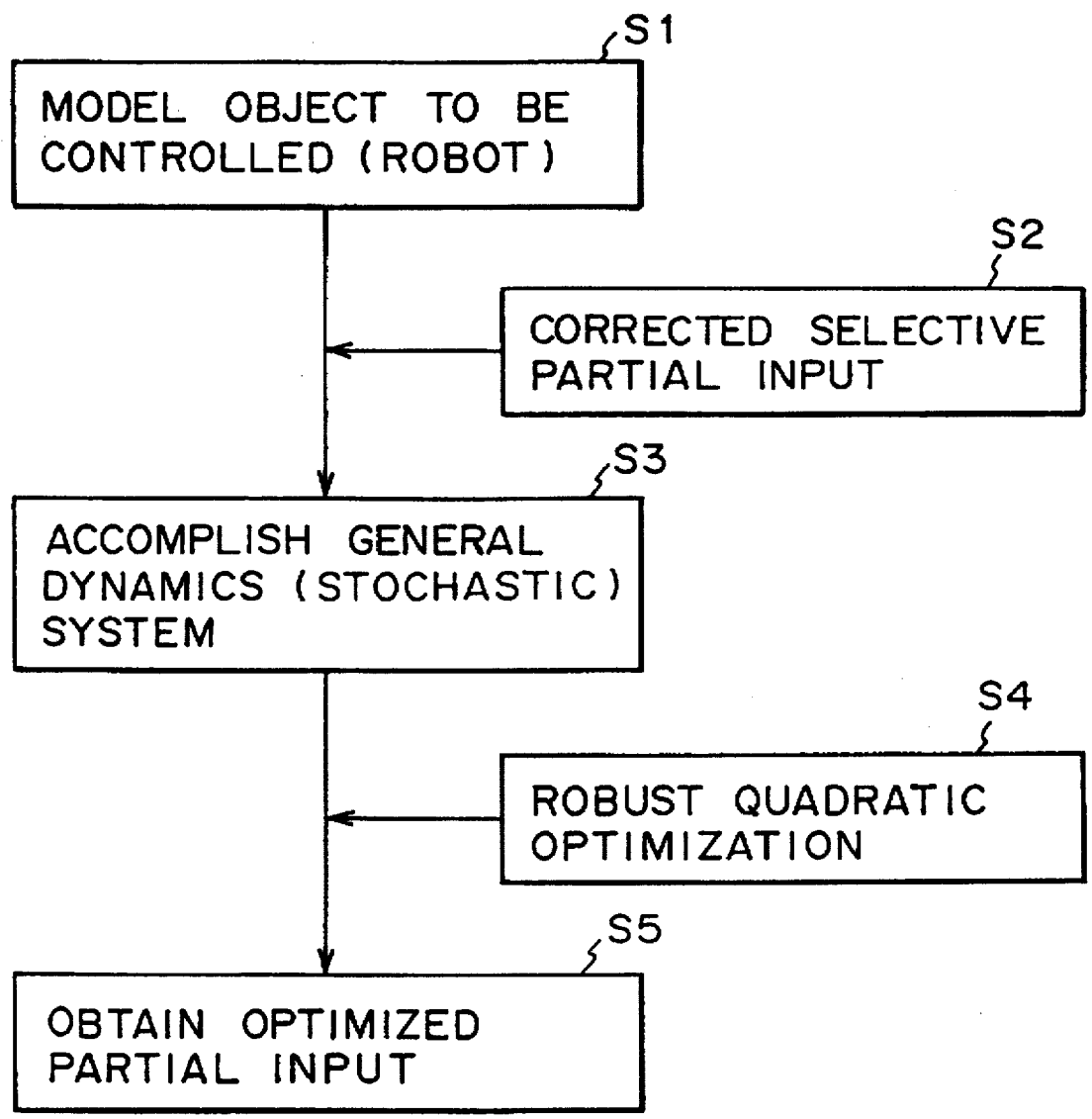
FIG. 5 is a basic flow chart showing a robust control method according to the present invention.

FIG. 5 is a basic flow chart of the control system according to the present invention. In FIG. 5, at step S1, an object to be controlled (for example, a robot) is modeled. In this case, a dynamics model that considers both an error in each of the true values of coefficient matrices and the noise is generated. The noise considered in the present invention is noise that takes place when a joint angle and a joint angular rate of the robot 1 shown in FIG. 1 are fed back to the tracking control apparatus 2, and the joint acceleration is obtained by numerical differentiation in the tracking control apparatus 2.

At step S2, a corrected selective partial input corresponding to equation (5) (which will be described later) is supplied to the dynamics model that has been generated at step S1. At step S3, an expression of a standard (dynamic) stochastic system corresponding to the object is obtained. At step S4, a robust quadratic optimizing process for minimizing the tracking error and control energy with taking into account "the worst modeling error" of the robot is performed corresponding to a control criterion (which will be described later). At step S5, an optimized partial input is obtained.

Figure 6:
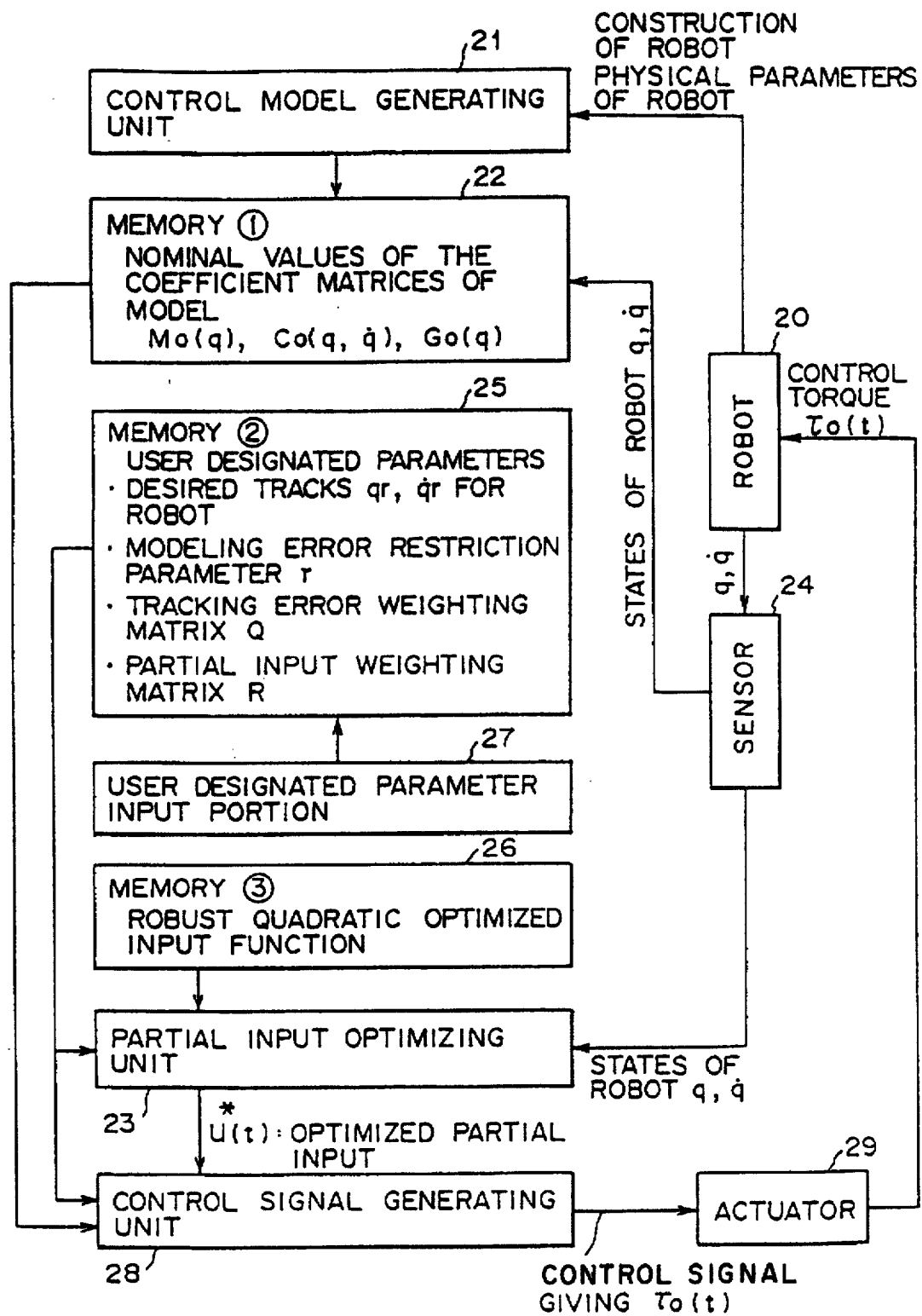
FIG. 6 is a block diagram showing a system construction of the robust control apparatus according to the present invention.

FIG. 6 is a block diagram showing a system construction of the robust control apparatus according to the present invention. In FIG. 6, a control model generating unit 21 generates a dynamics model of the robot 20 corresponding to the construction of the robot (such as an actuator and the number of degrees of freedom), available physical parameters, and nominal physical parameters. The nominal values of the coefficient matrices of the dynamics model (namely, the nominal values of the matrices M and C and the vector G of the above-described equation (1)) are stored in a memory (1) 22. The joint angular vector q, the joint angular rate vector $\dot{q}$, and so forth that are output from sensors and represent the state of the robot 20 are also stored in the memory (1) 22.

A partial input optimizing unit 23 optimizes the corrected selective partial input corresponding to the output value of a sensor 24 that detects the state of the robot 20, user designated parameters stored in a memory (2) 25, and a robust quadratic optimized input function stored in a memory (3) 26.

The user designated parameters stored in the memory (2) 25 are input from a user designated parameter input portion 27 by the user. The user designated parameters are a target track for the robot, a modeling error restricting parameter $\gamma$, a tracking error weighting matrix Q, and a partial input weighting matrix R. The modeling error restricting parameter $\gamma$ and the weighting matrices Q and R will be described later.

A control signal generating unit 28 generates a control signal for supplying a control torque $\tau_0$ to the robot 20 corresponding to the optimized partial input that is output from the partial input optimizing unit 23 and the contents stored in the memories (1) 22 and (2) 25. The output of the control signal generating unit 28 is sent to an actuator 29. Thus, the actuator 29 supplies a control torque $\tau_0(t)$ to the robot 20.

Next, the process of the system shown in FIG. 6 will be described corresponding to the flow chart of FIG. 5 in detail. In the present invention, the inaccuracies of the coefficient matrices and the random input are considered in the dynamics model so as to construct a tracking control apparatus for a robot that is robust to the inaccuracies of the dynamics model and random disturbances such as noise. In other words, as a dynamics model of the robot, the following equation (4) is included in the control apparatus.

$$(M_0(q)+\Delta M(q))\ddot{q}+(C_0(q,\dot{q})+\Delta C(q,\dot{q}))\dot{q}+(G_0(q)+\Delta G(q))=\tau_0+B_d\dot{w} \quad (4)$$

where $M_0(q)$, $C_0(q,\dot{q})$, and $G_0(q)$ are nominal values; $\Delta M(q)$, $\Delta C_0(q,\dot{q})$, and $\Delta G(q)$ are errors between true values and nominal values (these variables are unknown); $B_d$ is a bounded n×m matrix; and w(t) is a m-dimensional standard Wiener process and its formal time derivative denotes a white noise process.

The dynamics model expressed by the equation (4) has the following meaning. (i) Although it is problematic to accurately formulate the true values of the coefficient matrices M(q), C(q,$\dot{q}$)$\dot{q}$, and G(q) of the equation (1), it is relatively easy to supply approximately estimated values thereof as nominal values $M_0(q)$, $C_0(q,\dot{q})$, and $G_0(q)$. (ii) The term of white noise is an expression of random disturbances.

Thus, according to the present invention, when a control apparatus of a robot is produced, on the assumption that the dynamics model is imperfect, an imperfect model is permitted. As will be described later, in the case of a robot with two degrees of freedom, instead of concentrating the center of mass of the links of the robot at the edge portion for simplification, errors are included in the coefficient matrices for permitting the imperfectness of the model.

In addition, the present invention can be applied for the case that a model of a robot included in the control apparatus contains random disturbances. Depending on the operating environment of the robot, undesired noise may enter a control signal that is supplied from the control apparatus to the actuator of the robot. In other cases, since the robot should be controlled on a real time basis, when information from the sensors are fed back, it is difficult to numerically process the information with satisfactory accuracy. Thus, substantial noise (for example, noise from numerical differentiation) may enter the control apparatus. To prevent such a problem, according to the present invention, on the assumption that the model expressed by the equation (1) is imperfect, the equation (4) is used as a robot model included in the control apparatus so as to compensate the imperfectness of the model. In other words, a model in which coefficients are composed of errors between nominal values and true values and that includes random disturbances (namely, a model including, $\Delta P$, and the noise portion shown in FIG. 4) is included in the control apparatus by the control model generating unit 21 shown in FIG. 6.

The control model generating unit 21 generates a model intrinsic to the robot that is the object to be controlled corresponding to the equation (4), from the shape of the robot and an input of approximate physical characteristics in the control apparatus. The nominal values $M_0$, $C_0$, and $G_0$ of the coefficient matrices of the control model are stored in the memory (1) 22 shown in FIG. 6, so that the control signal generating unit 28 generates a control signal for generating a control torque that is supplied from the actuator 29 to the robot 20.

The substantial noise that takes place due to the above-described numerical differentiation is not white noise, but noise having a specific spectral distribution. Thus, when the noise is properly analyzed, a dynamics model that accurately represents the action of the physical system can be accomplished. However, the analysis of the noise spectrum distribution is a part of the parameter formulation of the physical system and is a very problematic process. According to the present invention, to simplify the construction of the control apparatus, white noise that includes spectral bands of all noise is supplied as the noise of a dynamics model.

By using the selective partial input described as the related art reference, a minimum energy tracking control problem can be treated as an optimum regulator problem. With reference to the inputs expressed by the equations (2) and (3), a selective partial input $\tilde{u}(t)$ that is corrected corresponding to the following equation (5) is introduced. The corrected selective partial input is denoted by $\tilde{u}(t)$.

$$\tilde{u}(t) = u_0(t) + \Delta u(t)$$

$$u_0(t) = [M_0(q)\ C_0(q,\dot{q})]\begin{bmatrix} \dot{z}(t) \\ z_1(t) \end{bmatrix}$$

$$\Delta u(t)=M_0T_{11}M_0^{-1}\{\delta(t)-B_d\dot{w}(t)\}\delta(t)=\Delta M(q)\ddot{q}+\Delta C(q,\dot{q})\dot{q}+\Delta G(q) \quad (5)$$

Thus, the dynamics model (4) is represented by the following equation (6).

$$\dot{x}(t)=A_0 x(t)+B_0\tilde{u}(t)+B_0 d(t)+B_1\dot{w}(t) \quad (6)$$

However, the matrices and vectors in the equation (6) are defined by the following equation (7).

$$A_0 = T_0^{-1}\begin{bmatrix} -M_0(q)^{-1}C_0(q,\dot{q}) & 0 \\ T_{11}^{-1} & -T_{11}^{-1}T_{12} \end{bmatrix} T_0,$$

$$B_0=T_0^{-1}I_B M_0(q)^{-1},\ B_1=I_B M_0^{-1}B_d,\ I_B=[I,\ 0]^T$$
$$d(t)=-M_0 T_{11} M_0^{-1}\delta(t) \quad (7)$$

The input torque of the dynamics model can be expressed by the following equation (8).

$$\tau_0(t) = M_0(q)\{\ddot{q}_r(t) - T_{11}^{-1}T_{12}\dot{q}_e(t) - \qquad (8)$$
$$T_{11}^{-1}M_0(q)^{-1}(C_0(q,\dot{q})J_B^TT_0x(t) - \bar{u}(t))\} +$$
$$C_0(q,\dot{q})\dot{q} + G_e(q).$$

The equation (8) is equivalent to the equation of the input torque of the standard (dynamic) stochastic system.

Next, the derivation of the equations (6) to (8) will be described. Equations used in the derivation of these equations are denoted by adding "A" for example (A1).

From the equation (3), the following equation (A1) is obtained.

$$x(t) = T_0^{-1}z(t) = T_0^{-1}\begin{bmatrix} z_1 \\ z_2 \end{bmatrix} = T_0^{-1}\begin{bmatrix} T_1x \\ \dot{q}_e \end{bmatrix}, \qquad (A1)$$

where $T_1$: $[T_{11}, T_{12}]$.

On the other hand, from the equation (5), the following equation (A2) is obtained.

$$T_1\dot{x} = M_0^{-1}(u_0 - C_0T_1x) \qquad (A2)$$

When the equation (A2) is substituted into the equation (A1), the dynamics model given by the equation (5) is expressed as follows.

$$\dot{x} = T_0^{-1}\begin{bmatrix} M_0^{-1}(u - C_0T_1x) \\ \ddot{q}_e \end{bmatrix} \qquad (A3)$$

$$= T_0^{-1}\begin{bmatrix} -M_0^{-1}C_0 & 0 \\ T_{11}^{-1} & -T_{11}^{-1}T_{12} \end{bmatrix}T_0x + T_0^{-1}\begin{bmatrix} M_0^{-1} \\ 0 \end{bmatrix}(\bar{u} - \Delta_u)$$

$$= A_0x + B_0\{\bar{u}_0 - M_0T_{11}M_0^{-1}(\delta - B_d\dot{w})\}$$

$$= A_0x + B_0(\bar{u}_0 + d) + B_1\dot{w}$$

The equation (A3) is equal to the equation (6) having matrices in the equation (7).

On the other hand, from the representation of the corrected control input of the equation (6), the following equation (A4) is obtained.

$$\ddot{q}_e = -T_{11}^{-1}M_0^{-1}(C_0J_BT_0x - u_0) - T_{11}^{-1}T_{12}\dot{q} \qquad (A4)$$

Thus, the following equation (A5) is obtained.

$$M_0\ddot{q} = M_0\{\ddot{q}_r - T_{11}^{-1}T_{12}\dot{q}_e - T_{11}^{-1}M_0^{-1}(C_0J_BT_0x - u_0)\} \qquad (A5)$$

When the equation (4) of the dynamics model is considered, the left side of the equation (A5) is substituted as in the following equation (A6).

$$\tau_0 - C_0\dot{q} - G_0 - \delta + B_d\dot{w} = \qquad (A6)$$
$$M_0\{\ddot{q}_r - T_{11}^{-1}T_{12}\dot{q}_e - T_{11}^{-1}M_0^{-1}(C_0J_BT_0x - u_0)\}$$

When the equation (A6) is solved with respect to $\tau_0$, the equation (8) is obtained.

In a control apparatus that performs a tracking operation, it receives information such as joint angle and joint angular velocity from sensors mounted on the robot, processes them, and generates a control signal so that the actuator generates a proper control torque. In the present invention, the partial input optimizing unit 23 shown in FIG. 6 performs an important role in such a process.

The partial input optimizing unit 23 treats a general quantity portion of the kinetic energy of the robot, a portion of the inaccuracies of the model of the control torque, and random disturbances as portions that can be optimized, optimizes them in a particular manner (which will be described later), and supplies them as feed-back inputs corresponding to sensor information to the control signal generating unit 28. In other words, in the equation (5), $u_0$ acts on a general quantity of the kinetic energy of the robot, whereas $\Delta u$ acts on the inaccuracies of the model and random disturbances.

Firstly, the partial input optimizing unit 23 maximally reduces the control energy of the partial input so that the tracking error becomes almost 0. However, according to the present invention, in consideration of the influence of the random disturbances, the tracking error is evaluated. Secondly, even if the error of the control model is too large, the partial input optimizing unit 23 reduces the influence of the error to the tracking control system to a predetermined level.

Thus, according to the present invention, corresponding to the following two references, the control criterion expressed by the equation (9) is defined.

Reference 2) Van der Schaft, A. J., "On a state space approach to nonlinear H∞ control", System & Control Letters, Vol. 16, pp. 1–8, 1990.

Reference 3) Chen, B. S, T. S. Lee, and J. H. Feng, "A Nonlinear H∞ Control design in robotic systems under parameter perturbation and external disturbance", Int. J. Control, Vol. 59, No. 2, pp. 439–461, 1994.

$$\min_{u}\max_{d}\lim_{t_f \to \infty} \frac{1}{t_f} E\left\{\int_0^{t_f} \frac{\xi_s^TQ\xi_s + \bar{u}^T(t)R\bar{u}(t)}{d^T(t)d(t)} dt \bigg| \xi_s = x(t)\right\} < \gamma^2 \qquad (9)$$

where $E\{\}$ is a mean value of (); and Q and R are weighting matrices to state quantities (tracking errors) and inputs that are given so that the following expression is satisfied.

$$Q = Q^T \geq \text{and } R = R^T > 0$$

$\gamma$ is a bounded constant.

In the control criterion of the equation (b 9), the first term of the numerator of the integrand is a quantity proportional to the square of the tracking error x(t) of the equation (3). The second term is a quantity proportional to the square of the input $\bar{u}(t)$ to be optimized. The denominator of the fraction is a quantity of the square of the modeling error of the equation (7). In this control criterion, as the first control system designing specification, the sum of the square of the tracking error and the square of the input is minimized under the worst effects of modeling errors. As the second control system designing specification, the result of which the sum of the square of the tracking error and the square of the input is divided by the square of the modeling error is limited to a particular value (constant $\gamma$) or less. Thus, it is necessary to optimize this portion.

Depending on the value of the parameter $\gamma$ of the control criterion expressed by the equation (9), the robust level of the control apparatus to the error between the true values and the nominal values of the coefficient matrices of the dynamics model is defined. Thus, this parameter $\gamma$ can be designated on a trial and error basis. The error between the true values and nominal values of the coefficient matrices is finite. In most cases, the quantity of the worst error can be estimated. At this point, the value of the parameter $\gamma$ can be determined with the estimated value of the worst error. However, as will be described later, the parameter $\gamma$ should satisfy conditions for stability so that the control system operates stably.

Corresponding to the control criterion expressed by the equation (9), the optimized partial input $u^*(t)$ and the worst influence $d^*(t)$ of the inaccuracy of the dynamics model are given by the following equation.

$$u^*(t) = -R^{-1}I_B{}^T T_o \xi_t, \quad d^*(t) = \frac{1}{\gamma^2} I_B{}^T T_o \xi_t \tag{10}$$

where $\xi_t$ is the sample value of the system state x at time t, i.e., $\xi_t = x(t)$, and the matrix $T_o$ is the solution of the following equation (11).

$$\begin{bmatrix} 0 & K \\ K & 0 \end{bmatrix} + Q - T_o T_B \left( R^{-1} - \frac{1}{\gamma^2} I \right) I_B{}^T T_o = 0, \tag{11}$$

where K is an n×n positive definite matrix.

Next, the derivation of the equations (10) and (11) will be described. The input u*(t) that optimizes the control criterion (9) satisfies the following Hamilton-Jacobi-Bellman equation.

$$-\frac{\partial V(\xi_t, t)}{\partial t} = \min_{u} \max_{d} \{L(\xi_t, \bar{u}, d, t) + LV(\xi_t, t)\} \tag{A7}$$

where $V(\xi_t, t)$ is a minimum cost functional whose specific form is unknown (because an input that minimizes the control criterion (9) has a degree of freedom). The right side of the equation (A7) is given by the following equations (A8) and (A9).

$$L(\xi_t, \bar{u}, d, t) = \xi_t{}^T(t) Q \xi_t(t) + \bar{u}^T(t) R \bar{u}(t) - \gamma^2 d^T(t) d(t) \tag{A8}$$

and $$L(\cdot) = [A_0 \xi_t + B_0(\bar{u} + d)]^T \frac{\partial(\cdot)}{\partial \xi_t} + \tag{A9}$$

$$\frac{1}{2} \text{trace} \left[ B_1{}^T \frac{\partial}{\partial \xi_t} \left( \frac{\partial(\cdot)}{\partial \xi_t} \right)^T B_1 \right]$$

To practically form the optimized input, the Hamilton-Jacobi-Bellman equation (A7) should be solved with respect to the input. Thus, the minimum cost functional $V(\xi_t, t)$ should be practically defined. In this example, using the following reference, the minimum cost functional $V(\xi_t, t)$ is defined as the following equation (A10).

Reference 4) Sunahara, "Stochastic System Theory", Chapter 13, The Institute of Electronics, Information, and Communication Engineers of Japan, 1979.

$$V(\xi_t, t) = \xi_t{}^T T_0{}^T \begin{bmatrix} M_o(g) & 0 \\ 0 & K \end{bmatrix} T_o \xi_t + \beta(t) \tag{A10}$$

where K is the positive definite matrix in equation (11) and β(t) is a positive scalar function. Then the terms in the Hamilton-Jacobi-Bellman equation (A7) are evaluate as follows:

$$\frac{\partial V(\xi_t, t)}{\partial t} = \xi_t{}^T T_o{}^T \begin{bmatrix} \frac{\partial M_o(q)}{\partial t_0} & 0 \\ 0 & 0 \end{bmatrix} T_o \xi_t + \dot{\beta}(t), \tag{A11}$$

and $$LV(\xi_t, t) = [A_0 \xi_t + B_0(\bar{u} + d)]^T \frac{\partial V(\xi_t, t)}{\partial \xi_t} + \tag{A12}$$

$$\frac{1}{2} \text{trace} \left[ B_1{}^T \frac{\partial}{\partial \xi_t} \left( \frac{\partial V(\xi_t, t)}{\partial \xi_t} \right)^T B_1 \right]$$

$$= \xi_t{}^T T_0{}^T \begin{bmatrix} M_0(q) & 0 \\ 0 & K \end{bmatrix} T_0 (A_0 \xi_t + B_0 \bar{u} + B_0 d) +$$

$$(\xi_t{}^T A_0{}^T + \bar{u}^T B_0{}^T + d^T B_0{}^T) T_0{}^T \begin{bmatrix} M_0(q) & 0 \\ 0 & K \end{bmatrix} T_0 \xi_t +$$

$$\xi_t{}^T T_0{}^T \begin{bmatrix} \left( \frac{\partial M_0(q)}{\partial \xi_t} \right)^T \xi_t & 0 \\ 0 & 0 \end{bmatrix} T_0 \xi_t +$$

$$\frac{1}{2} \text{trace} \left[ B_1{}^T \frac{\partial}{\partial \xi_t} \left( \frac{\partial V(\xi_t, t)}{\partial \xi_t} \right)^T B_1 \right]$$

$$= \xi_t{}^T T_0{}^T \begin{bmatrix} 0 & K \\ K & 0 \end{bmatrix} T_0 \xi_t +$$

$$\xi_t{}^T \left\{ - \begin{bmatrix} T_{11}^T \\ T_{12}^T \end{bmatrix} (C_0(q, \dot{q}) + C_0{}^T(q, \dot{q})) [T_{11} \ T_{12}] \right\} \xi_t +$$

$$\xi_t{}^T T_0{}^T T_B(\bar{u} + d) + (\bar{u}^T + d^T) I_B{}^T T_0 \xi_t +$$

$$\xi_t{}^T T_0{}^T \begin{bmatrix} \left( \frac{\partial M_0(q)}{\partial \xi_t} \right)^T \xi_t & 0 \\ 0 & 0 \end{bmatrix} T_0 \xi_t +$$

$$\frac{1}{2} \text{trace} \left[ B_1{}^T \frac{\partial}{\partial \xi_t} \left( \frac{\partial V(\xi_t, t)}{\partial \xi_t} \right)^T B_1 \right]$$

Note that the term $C_o(q, \dot{q})$ of the dynamic model of the robot can be decomposed as, $$C(q, \dot{q}) \dot{q} = \dot{M}_0(q) \dot{q} - \frac{1}{2} \frac{\partial}{\partial q} \{ \dot{q}^T M_0(q) \dot{q} \} \tag{A13}$$

$$= \frac{1}{2} \dot{M}_0(q) \dot{q} + S(q, \dot{q})$$

Where $S(q, \dot{q})$ is a skew symmetric matrix. i.e., $s(q, \dot{q}) + S^T(q, \dot{q}) = 0$.

Substituting equation (A12) into equation (A11), the term $\zeta V(\xi_t, t)$ may also be reduced to give $$LV(\xi_t, t) = \xi_t{}^T T_0{}^T \begin{bmatrix} 0 & K \\ K & 0 \end{bmatrix} T_0 \xi_t - \xi_t{}^T T_0{}^T \begin{bmatrix} \frac{dM_0(q)}{dt} & 0 \\ 0 & 0 \end{bmatrix} T_0 \xi_t + \tag{A14}$$

$$\xi_t{}^T T_0{}^T I_B(\bar{u} + d) + (\bar{u}^T + d^T) I_B{}^T T_0 \xi_t +$$

$$\xi_t{}^T T_0{}^T \begin{bmatrix} \left( \frac{\partial M_0(q)}{\partial \xi_t} \right)^T \xi_t & 0 \\ 0 & 0 \end{bmatrix} T_0 \xi_t +$$

$$\frac{1}{2} \text{trace} \left[ B_1{}^T \frac{\partial}{\partial \xi_t} \left( \frac{\partial V(\xi_t, t)}{\partial \xi_t} \right)^T B_1 \right]$$

The right hand side of equation (A7) is the Hamiltonian and it is obtained from equations (A8) and (A14) as follows:

$$H(\xi_r, \bar{u}, d, LV) = L(\xi_r, \bar{u}, d, t) + LV(\xi_r, t) \quad (A15)$$

$$= \xi_r^T Q \xi_r + \bar{u}^T R \bar{u} - \gamma^2 d^T d +$$

$$\xi_r^T T_0^T \begin{bmatrix} 0 & K \\ K & 0 \end{bmatrix} T_0 \xi_r - \xi_r^T T_0^T \begin{bmatrix} \frac{dM_0(q)}{dt} & 0 \\ 0 & 0 \end{bmatrix} T_0 \xi_r +$$

$$\xi_r^T T_0 \eta_B (\bar{u} + d) + (\bar{u}^T + d^T) \eta_B^T T_0 \xi_r +$$

$$\xi_r^T T_0^T \begin{bmatrix} \left(\frac{\partial M_0(q)}{\partial \xi_r}\right)^T \xi_r & 0 \\ 0 & 0 \end{bmatrix} T_0 \xi_r +$$

$$\frac{1}{2} \text{trace} \left[ B_1^T \frac{\partial}{\partial \xi_r} \left( \frac{\partial V(\xi_r, t)}{\partial \xi_r} \right)^T B_1 \right]$$

The optimal input $\bar{u}=u^*$ for which H has its minimum value is obtained from the partial derivatives with respect to u $$\frac{\partial H}{\partial \bar{u}} = I_B^T T_0 \xi_r + R \bar{u} \quad (A16)$$

Extremal of the Hamiltonian with respect to $\bar{u}$ is founded by the setting the partial derivative $\partial H / \partial \bar{u}=0$. The optimal input is obtained as, $$u^* = -R^{-1} I_B^T T_0 \xi_r \quad (A17)$$

The worst effects modeling errors $d=d^*$ for which H has its maximum value is also obtained from the partial derivative with respect to d $$\frac{\partial H}{\partial d} = I_B^T T_0 \xi_r - \gamma^2 d \quad (A18)$$

Extremal of the Hamiltonian with respect to d is found by the setting the partial derivative $\partial H / \partial d = 0$. The worst effect of parametric uncertainties is obtained as, $$d^* = \frac{1}{\gamma^2} I_B^T T_0 \xi_r. \quad (A19)$$

Substituting equations (A8),(A14),(A17) and (A19) into equation (A7), the equation with respect to $T_o$ and the equation with respect to $\beta(t)$ are obtained as follows, $$\begin{bmatrix} 0 & K \\ K & 0 \end{bmatrix} + Q - T_0 \eta_B \left( R^{-1} - \frac{1}{\gamma^2} I \right) I_B^T T_0 = 0, \quad (A20)$$

$$\beta(t) + \frac{1}{2} \text{trace} \left[ B_1^T \frac{\partial}{\partial \xi_r} \left( \frac{\partial V(t)}{\partial \xi_r} \right)^T B_1 \right] = 0. \quad (A21)$$

When the weighing matrix Q of the control criterion is expressed as follows, $$Q = \begin{bmatrix} Q_1^T Q_1 & Q_{12} \\ Q_{12}^T & Q_2^T Q_2 \end{bmatrix} \quad (12)$$

Thus, it is clear that the matrices $T_0$ and K used to generate the optimized input $u^*(t)$ can be expressed by the following equations (13) and (14), respectively.

$$T_0 = \begin{bmatrix} \tilde{R}^T Q_1 & \tilde{R}^T Q_2 \\ 0 & 1 \end{bmatrix} \quad (13)$$

$$K = K^T = \frac{1}{2} \{(Q_1^T Q_2 + Q_2^T Q_1) - (Q_{12} + Q_{12}^T)\} > 0 \quad (14)$$

However, the matrices $Q_1$, $Q_2$, and $Q_{12}$ should be selected so that they satisfy the inequality (14). In addition, the matrix $\tilde{R}$ is defined as follows.

$$\tilde{R}^T \tilde{R} = \left[ R^{-1} - \frac{1}{\gamma^2} I \right]^{-1}, \quad (15)$$

Thus, the input $u^*(t)$ corresponding to the optimized input constructing method can be easily obtained from a small number of calculations. By substituting the input $u^*(t)$ into the equation (8), an optimum torque $\tau_o$ to be applied by the actuator can be obtained.

Next, $Q_1$, $Q_2$, $Q_{12}$, and so forth in the equations (12) to (14) will be described. Firstly, the matrix Q with a dimension of $2n \times 2n$ is divided into four matrices with dimensions of $n \times n$ as in the following equation (A22).

$$Q = \begin{bmatrix} Q_{11} & Q_{12} \\ Q_{21} & Q_{22} \end{bmatrix} \quad (A22)$$

where Qij (i=1, 2; j=1, 2) are matrices each having a dimension of $n \times n$. As described above, Q is a positive diagonal matrix and has the following relation represented by the following expression (A23).

$$Q_{11} = Q_{11}^T \geq 0, \; Q_{22} Q_{22}^T \geq 0, \; Q_{21} = Q_{12}^T \quad (A23)$$

In addition, considering the characteristics of $Q_{11}$ and $Q_{22}$, matrices $Q_1$ and $Q_2$ that are square roots thereof are expressed as follows.

$$Q_{11} = Q_1^T Q_1, \; Q_{22} = Q_2^T Q_2 \quad (A24)$$

As a practical problem, the stability of the operation of the control system should be assured. When a stability condition is obtained corresponding to the following reference, the following equation is obtained. The value of the parameter $\gamma$ of the control criterion expressed by the equation (9) should satisfy this stability condition.

Reference 5) Sunahara, "Probability System Theory", Chapter 9, The Institute of Electronics, information, and Communication Engineers of Japan, 1979.

$$\gamma^2 I - R > 0 \quad (16)$$

Next, the derivation of the equation (12) will be described. When a functional that is called a Ljapunov function is present in the system to be controlled, the stability of the operation of the system is assured. This result is extended to a control system (stochastic system) that receives a random input. In other words, when a functional $V_1(t, \xi_r)$ that has the following two characteristics is present in the probability system, the functional $V_1(t, \xi_r)$ is referred to as a stochastic Ljapunov function and the stability of the probability system to be controlled is assured.

(P, 1) $V_1(t, \xi_r) > 0$, for $t_0 < t < t_f$ (P, 2) $V_1(t_0, \tau_0) > V_1(t, \xi_r) > V_1(t_f, \xi_{rf})$ for $t_0 < t < t_f$ Now, it is assumed that $V(\xi_r, t)$ expressed in the equation (A10) is an alternative of the Ljapunov function. Due to the definition of $V(\xi_r, t)$, it is obvious that (P, 1) is satisfied. Next, it will be explained how (P, 2) is satisfied. When Itoh's formula (for example, see Reference 5) is applied for $V(\xi_r, t)$, the following equation (A25) is obtained.

$$V(\xi_{s_f},t) - V(\xi_{s_f},t_f) = -E\left\{ \int_t^{t_f} \left[ \frac{\partial V(s,\xi_s)}{\partial s} + \alpha V(s,\xi_s) \right] ds \right\} = \quad (A25)$$

$$-E\left\{ \int_t^{t_f} \left[ \xi_s^T T_0^T \begin{bmatrix} 0 & K \\ K & 0 \end{bmatrix} T_0 \xi_s - 2\xi_s^T T_0^T I_B \left( R^{-1} - \frac{1}{\gamma^2} I \right) I_B^T T_0 \xi_s + \dot{\beta}(t) + \frac{1}{2} \text{trace}\left[ B_1^T \frac{\partial}{\partial \xi_s} \left( \frac{\partial V(\xi_s,t)}{\partial \xi_s} \right)^T B_1 \right] \right] ds \right\}$$

When this equation is derived, the result of the equation (A13) is used. When the matrix $T_o$ and the function $\beta(t)$ satisfy the equations (11) and (A21), respectively corresponding to the equation (16), the following equation (A26) is obtained.

$$V(\xi_{s_f},t) - V(\xi_{s_f},t_f) = \quad (A26)$$

$$E\left\{ \int_t^{t_f} \xi_s^T \left[ Q + T_0 I_B \left( R^{-1} - \frac{1}{\gamma^2} I \right) I_B^T T_0 \right] \xi_s \, ds \right\}$$

When $\gamma^2 I - R > 0$ and $Q > 0$ are satisfied, the following equation (A27) is obtained.

$$V(t, \xi_s) > V(t_f, \xi_{s_f}) \quad (A27)$$

Thus, it is clear that $V(t, \xi_t)$ also satisfied (P, 2). Consequently, $V(t, \xi_t)$ satisfies the characteristic of the Ljapunov function. As a result, it is proved that the Ljapunov function for the control system is present and the stability of the operation is assured.

Thus, a practical optimized input u(t) is obtained. Corresponding to the equation (8), the torque to be generated by the actuator can be calculated. Corresponding to the control criterion expressed by the equation (9), the partial input optimization shown in FIG. 6 will be further described.

As described above, the input that satisfies the optimization represented by the control criterion expressed by the equation (10), is constructed of the joint angular displacement and the joint angular velocity of the robot that are fed back as sensor information corresponding to the robust quadratic optimizing method. The function of the control criterion that is stored in the memory ③ 26 shown in FIG. 6 is used by the partial input optimizing unit 23.

To cause the partial input optimizing unit 23 to generate a practical optimizing partial input, the user should designate several parameters for the optimization and input them to the control apparatus. The user designated parameter inputting portion 27 is used to input these parameters. As the user designated parameters, four parameters are input to the memory ② 25. A first parameter is a desired track that is given as a target to the robot. The desired track is composed of a target track qr of joint angular displacement and a target track $q_r$ of joint angular velocity.

A second parameter is a parameter γ for restricting the influence of the modeling error to the tracking control. When the worst value of the modeling error can be estimated, the value of the parameter γ can be determined corresponding to the worst value. When the worst value cannot be estimated, the value of the parameter γ is designated in consideration of the stability condition that is a restriction condition for allowing the control apparatus to operate stably.

A third parameter is a constant matrix Q for reducing the tracking error. This matrix weights the tracking error. This matrix should have an order that is twice as large as the number of degrees of freedom of the robot. In addition, the matrix should be a positive diagonal matrix. For example, when a robot with two degrees of freedom is controlled, the third parameter should be a positive diagonal matrix with a dimension of 4×4. As a simple example, a matrix of which a unit matrix is multiplied by a constant can be used as Q.

A fourth parameter is a constant matrix R for reducing the control energy. In other words, the fourth parameter is a weighting matrix of a partial input. The fourth parameter should be a diagonal and positive matrix that has the same number of degrees of freedom as that of the robot. When a robot with two degrees of freedom is controlled, this parameter should be a positive diagonal parameter with a dimension of 2×2. When the value of the parameter γ has been designated as the second parameter γ, the parameter should be designated in consideration of the above-described stability condition. When the value of the parameter γ has not been designated, the matrix R should be properly designated and the value of the parameter γ should be designated in consideration of the stability condition.

When the partial input optimizing unit 23 receives output information from the sensor 24 of the robot 20, the unit 23 generates a practical optimizing portion input signal corresponding to the sensor information, the four user designated parameters, and the robust quadratic optimizing input function and outputs the resultant signal to the control signal generating unit 28.

The control signal generating unit 28 receives the output of the partial input optimizing unit 23 and outputs a control signal to the actuator 29. As well as the optimized partial input, the control torque generated by the actuator includes the coefficient matrices of the control model generated by the control model generating unit 21 and the four user designated parameters that are input to the partial input optimizing unit 23. These input components are obtained from the respective memories. The control signal generating unit 28 processes the outputs of the memories and the partial input optimizing unit 23 and then supplies the control signal to the actuator 29.

As described above, the selective partial input of the robot control is a quantity in the general format of kinetic energy, and that is a portion that can be optimized in the total control torque. In other words, the amount in the general format of the kinetic energy on the right side of the equation (2) as the related art reference is expressed as u(t). By solving the problem in which the value of u(t) is minimized, the partial input is obtained. Corresponding to the partial input, the control torque is optimized so as to accomplish the tracking control of the robot.

According to the present invention, in consideration of the inaccuracies of a model and the influence of random disturbances, a corrected selective partial input defined by the equation (5) is used as an object to be optimized. The selective partial input is optimized so as to obtain a partial input. A control torque is composed of the partial input. In other words, the tracking control is accomplished without the need to use an unknown quantity (such as ΔM).

Figure 7:
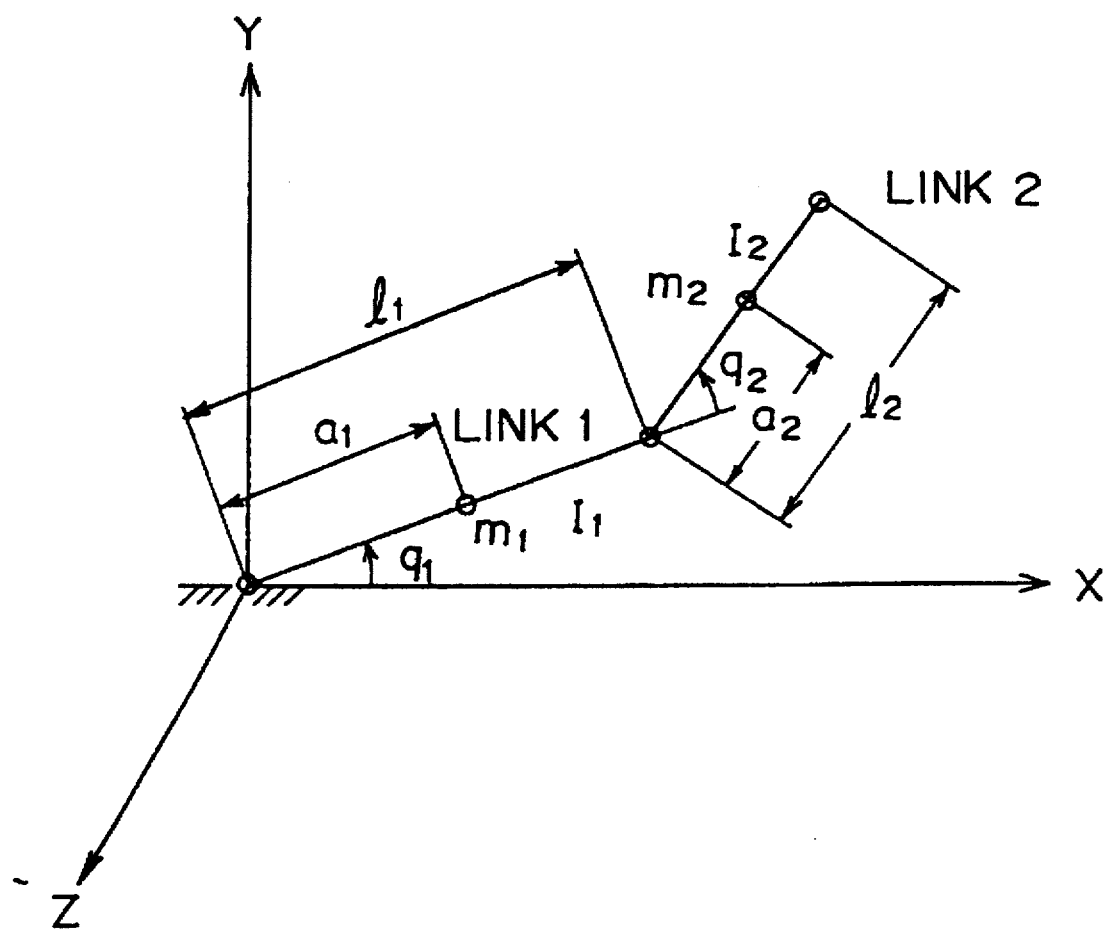
FIG. 7 is a vector diagram showing a concept of a robot with two degrees of freedom.

A practical example for simplifying the optimized input construction using characteristics intrinsic to a robot will be further described. In this example, a robot with two links (namely, two degrees of freedom) as shown in FIG. 7 will be described. In FIG. 7, dynamic characteristics corresponding to the equation (1) are expressed by the following equation (17).

$$\begin{bmatrix} M_{11} & M_{12} \\ M_{12} & M_{22} \end{bmatrix} \begin{bmatrix} \ddot{q}_1 \\ \ddot{q}_2 \end{bmatrix} + m_2 l_1 a_2 \sin q_2 \begin{bmatrix} -\dot{q}_2 & -\dot{q}_1 - \dot{q}_2 \\ \dot{q}_1 & 0 \end{bmatrix} \begin{bmatrix} \dot{q}_1 \\ \dot{q}_2 \end{bmatrix} + \begin{bmatrix} G_1 \\ G_2 \end{bmatrix} = \begin{bmatrix} \tau_1 \\ \tau_2 \end{bmatrix} \quad (17)$$

where the elements of the matrices are expressed as follows:

$M_{11} = m_1 a_1^2 + I_1 + m_2(l_1^2 + a_2^2 + 2l_1 a_2 \cos q_2) + I_2$, $M_{12} = M_{21} = m_2(a_2^2 + l_1 a_2 \cos q_2) + I_2$, $M_{22} = m_2 a_2^2 + I_2$, $G_1 = m_1 g a_1 \cos q_1 + m_2 g(l_1 \cos q_1 + a_2 \cos (q_1 + q_2))$, $G_2 = m_2 g a_2 \cos (q_1 + q_2)$ (18)

where qi (i=1, 2) is the rotating angle of a joint i: $m_i$ (i=1, 2) is the mass of the link i; $l_i$ (i=1, 2) is the length of the link i; $\alpha_i$ (i=1, 2) is the length between the joint i and the center of the mass thereof; $I_i$ (i=1, 2) is the inertia moment around a shaft that passes through the center of the mass of the link i and that is parallel to the axis Z; g is the magnitude of the acceleration due to gravity; and $\tau_i$ (i=1, 2) is the torque of the actuator on the joint i. With respect to the matrices M(q) and C(q, $\dot{q}$), the following equation (19) is satisfied.

$$C(q, \dot{q}) - \frac{1}{2} \dot{M}(q) = m_2 l_1 a_2 \sin q_2 \begin{bmatrix} 0 & -\left(\dot{q}_1 + \frac{1}{2} \dot{q}_2\right) \\ \dot{q}_1 + \frac{1}{2} \dot{q}_2 & 0 \end{bmatrix} \quad (19)$$

$$= S(q, \dot{q})$$

The following property that is intrinsic to the dynamic characteristics of the robot with respect to the equation (A13) is satisfied.

$S(q, \dot{q}) + S^T(q, \dot{q}) = 0$ (20)

The dynamics model of the most simple robot with two degrees of freedom is still very complicated, as described above. When it is supposed that the center of the mass of the link portion is placed at the edge of the arm ($\alpha_i = l_i$ and $I_i = 0$), the dynamics model can be greatly simplified. In this case, the coefficient matrices can be expressed as follows.

$$M(q) = \begin{bmatrix} (m_1 + m_2)l_1^2 + m_2 l_2^2 + 2m_2 l_1 l_2 C_2 & m_2(l_2^2 + l_1 l_2 C_2) \\ m_2(l_2^2 + l_1 l_2 C_2) & m_2 l_2^2 \end{bmatrix} \quad (21)$$

$$C(q, \dot{q}) = m_2 l_1 l_2 S_2 \begin{bmatrix} -\dot{q}_2 & -\dot{q}_1 - \dot{q}_2 \\ \dot{q}_1 & 0 \end{bmatrix}$$

$$G(q) = g \begin{bmatrix} (m_1 + m_2)l_1 C_1 + m_2 l_2 C_{12} \\ m_2 l_2 C_{12} \end{bmatrix}$$

where $C_1 = \cos q_1$; $C_{12} = \cos (q_1 + q_2)$; $C_2 = \cos q_2$; and $S_2 = \sin q_2$.

Thus, the dynamics model of the robot to be tracked becomes simplified. However, the assumption that the center of the mass of the link portion is placed at the edge portion of the arm is not practical. Thus, there will be a large error to the real operation of the robot. When the dynamics model is not simplified, the elements of the coefficient matrix include parameters that cannot be accurately obtained (such as the center position of the mass and the moment of inertia), and it is difficult to accurately define the coefficient matrices. Thus, it seems that a control apparatus can be designed most practically on the assumption that each coefficient matrix includes an error.

It is easy to obtain accurate values of the lengths $l_1$ and $l_2$ of the masses $m_1$ and $m_2$ of the links of the robot to be controlled. Corresponding to these values, nominal values of the coefficient matrices can be specifically obtained. In the case of the robot with two links, the nominal values of the coefficient matrices are obtained as follows.

$$M_0(q) = \begin{bmatrix} \alpha_{m1} + \alpha_{m2} + \alpha_{m3} C_2 & \alpha_{m2} + \alpha_{m3} C_2 \\ \alpha_{m2} + \alpha_{m3} C_2 & \alpha_{m2} \end{bmatrix} \quad (22)$$

$$C_0(q_1, \dot{q}) = \alpha_c S_2 \begin{bmatrix} -\dot{q}_2 & -\dot{q}_1 - \dot{q}_2 \\ \dot{q}_1 & 0 \end{bmatrix},$$

$$G_0(q) = g \begin{bmatrix} \alpha_{g1} C_1 + \alpha_{g2} C_{12} \\ \alpha_{g2} C_{12} \end{bmatrix}$$

where $\alpha_{m1}$, $\alpha_{m2}$, $\alpha_{m3}$, $\alpha_c$, $\alpha_{g1}$, and $\alpha_{g2}$ are constants depending on the masses and lengths of the links. Thus, it seems that matrices that represent errors of the nominal values are expressed as follows.

$$\Delta M(q) = \begin{bmatrix} \delta_{m1} + \delta_{m2} + \delta_{m3} C_2 & \delta_{m2} + \delta_{m3} C_2 \\ \delta_{m2} + \delta_{m3} C_2 & \delta_{m2} \end{bmatrix} \quad (23)$$

$$\Delta C(q, \dot{q}) = \delta_c S_2 \begin{bmatrix} -\dot{q}_2 & -\dot{q}_1 - \dot{q}_2 \\ \dot{q} & 0 \end{bmatrix},$$

$$\Delta G(q) = g \begin{bmatrix} \delta_{g1} C_1 + \delta_{g2} C_{12} \\ \delta_{g2} C_{12} \end{bmatrix}$$

where $\delta_{m1}$, $\delta_{m2}$, $\delta_{m3}$, $\delta_c$, $\delta_{g1}$, and $\delta_{g2}$ are constants that represent the magnitudes of errors. However, as described above, these values do not relate to the construction of the control input. Nevertheless, as long as the worst estimated value of the parameter error can be properly evaluated, the constant γ that defines the robust level of the control apparatus can be determined corresponding to the estimated value.

The property that is intrinsic to the dynamic characteristics of the robot is expressed by the following equation.

$S(q, \dot{q}) + S^T(q, \dot{q}) = 0$ (24)

Corresponding to the equation (24), the optimized partial input u*(t) to be generated by the robust control apparatus is expressed by the equations (10) to (15). The control apparatus generates the following optimized partial input u*(t) for the robot with two degrees of freedom.

$$u^*(t) = \begin{bmatrix} u_1^*(t) \\ u_2^*(t) \end{bmatrix} = -R^{-1}I_B{}^T T_0 \xi_t \quad (25)$$

$$= -\begin{bmatrix} r_{11} & r_{12} \\ r_{12} & r_{22} \end{bmatrix}^{-1} \begin{bmatrix} 1000 \\ 0100 \end{bmatrix} \begin{bmatrix} f_{11}^{(11)} & f_{12}^{(11)} & f_{11}^{(12)} & f_{12}^{(12)} \\ f_{21}^{(11)} & f_{22}^{(11)} & f_{21}^{(12)} & f_{22}^{(12)} \\ 0 & 0 & 1 & 0 \\ 0 & 0 & 0 & 1 \end{bmatrix} \begin{bmatrix} q_1 - q_{r1} \\ q_2 - q_{r2} \\ \dot{q}_1 - \dot{q}_{r1} \\ \dot{q}_2 - \dot{q}_{r2} \end{bmatrix}$$

$$= -\begin{bmatrix} r_{11} & r_{12} \\ r_{12} & r_{22} \end{bmatrix}^{-1} \begin{bmatrix} f_{11}^{(11)} & f_{12}^{(11)} & f_{11}^{(12)} & f_{12}^{(12)} \\ f_{21}^{(11)} & f_{22}^{(11)} & f_{21}^{(12)} & f_{22}^{(12)} \end{bmatrix}$$

where $u_i^*(t)$ is the optimized partial input of the i-th joint actuator; $q_{ri}$ is the desired state (angle) of the i-th joint; $\gamma_{ij}$ is a scalar quantity that represents the elements of a matrix R with dimensions of 2×2; and $t_{ij}^{(11)}$, $t_{ij}^{(12)}$ are scalar quantities that represent elements of matrices $T_{11}$ and $T_{12}$ each having a dimension of 2×2.

Corresponding to the equations (13) and (14), the scalar quantities $t_{ij}^{(11)}$ and $t_{ij}^{(12)}$ are expressed as follows.

$$T_{11} = \begin{bmatrix} t_{11(11)} & t_{12}^{(11)} \\ t_{21}^{(11)} & t_{22}^{(11)} \end{bmatrix} = \begin{bmatrix} \tilde{r}_{11} & \tilde{r}_{12} \\ \tilde{r}_{12} & \tilde{r}_{22} \end{bmatrix} \begin{bmatrix} q_{11}^{(1)} & q_{12}^{(1)} \\ q_{12}^{(1)} & q_{22}^{(1)} \end{bmatrix} \quad (26)$$

$$T_{12} = \begin{bmatrix} t_{11}^{(12)} & t_{12}^{(12)} \\ t_{21}^{(11)} & t_{22}^{(11)} \end{bmatrix} = \begin{bmatrix} \tilde{r}_{11} & \tilde{r}_{12} \\ \tilde{r}_{12} & \tilde{r}_{22} \end{bmatrix} \begin{bmatrix} q_{11}^{(2)} & q_{12}^{(2)} \\ q_{12}^{(2)} & q_{22}^{(2)} \end{bmatrix}$$

Where $\tilde{r}_{ij}$ are scalar quantities that represent elements of the matrix $\tilde{R}$ with dimensions of 2×2 that are defined in the equation (15). $\tilde{r}_{ij}$ is determined by weighting matrix R and the parameter $\gamma$ that satisfy the stability condition of the equation (16). $(q_{ij}^{(1)}, q_{ij}^{(2)})$ are scalar quantities that represent elements of matrices $Q_1$ and $Q_2$ each having a dimension of 2×2. $q_{ij}^{(1)}, q_{ij}^{(2)})$ are determined by the weighting matrix Q that satisfies the inequality (14).

The weighting matrix Q is represented by the following equation (27).

$$Q = \tilde{q}I \quad (27)$$

where $\tilde{q}$ is a positive constant.

The weighting matrix R is represented by the following equation (28).

$$R = \tilde{r}I \quad (28)$$

where $\gamma > \tilde{r}I$ (28)

Thus, $\tilde{R}$ can be simply expressed as follows.

$$\tilde{R} = \tilde{r}I = \sqrt{\frac{1}{r} - \frac{1}{\gamma^2}} \begin{bmatrix} 1 & 0 \\ 0 & 1 \end{bmatrix} \quad (29)$$

In addition, the matrices $T_{11}$ and $T_{12}$ are simply expressed.

$$T_{11} = \begin{bmatrix} t_{11}^{(1)} & t_{12}^{(1)} \\ t_{21}^{(1)} & t_{22}^{(1)} \end{bmatrix} = \tilde{r}\tilde{q} \begin{bmatrix} 1 & 0 \\ 0 & 1 \end{bmatrix}, \quad (30)$$

$$T_{12} = \begin{bmatrix} t_{11}^{(12)} & t_{12}^{(12)} \\ t_{21}^{(12)} & t_{22}^{(12)} \end{bmatrix} = \tilde{r}\tilde{q} \begin{bmatrix} 1 & 0 \\ 0 & 1 \end{bmatrix},$$

By selecting Q, R, and $\gamma$ in the above-described manner, the optimized partial input $u^*(t)$ can be generated by the following simple operation.

$$u^*(t) = \begin{bmatrix} u_1^*(t) \\ u_2^*(t) \end{bmatrix} = -\frac{\tilde{r}\tilde{q}}{r} \begin{bmatrix} q_1 - q_{r1} + \dot{q}_1 - \dot{q}_{r1} \\ q_2 - q_{r2} + \dot{q}_2 - \dot{q}_{r2} \end{bmatrix} \quad (31)$$

Finally, the input torque equivalent to the equation (8) is expressed by the following equation.

$$\tau_0(t) = \begin{bmatrix} \tau_{01}(t) \\ \tau_{02}(t) \end{bmatrix} = M_0(q) \left\{ \begin{bmatrix} \ddot{q}_{r1} \\ \ddot{q}_{r2} \end{bmatrix} - \begin{bmatrix} \dot{q}_1 - \dot{q}_{r1} \\ \dot{q}_2 - \dot{q}_{r2} \end{bmatrix} \right\} - \quad (32)$$

$$C_0(q, \dot{q}) \left\{ \begin{bmatrix} \dot{q}_1 - \dot{q}_{r1} \\ \dot{q}_2 - \dot{q}_{r2} \end{bmatrix} + \begin{bmatrix} q_1 - q_{r1} \\ q_2 - q_{r2} \end{bmatrix} \right\} -$$

$$\frac{1}{r} \begin{bmatrix} q_1 - q_{r1} + \dot{q}_1 - \dot{q}_{r1} \\ q_2 - q_{r2} + \dot{q}_3 - \dot{q}_{r2} \end{bmatrix} + C_o(q, \dot{q}) \begin{bmatrix} \dot{q}_1 \\ \dot{q}_2 \end{bmatrix} + G_0(q)$$

Next, with reference to FIG. 7, the result of a simulation of a robot with two degrees of freedom will be described. The sampling period of the simulation was $\Delta t = 2^{-6} = 0.015625$.

Physical parameters used in the simulation are as follows.
Mass of link 1, $m_1 = 2$ kg
Mass of link 2, $m_2 = 10$ kg
(The mass of the link 2 includes the load of the edge portion.)
Length of link 1, $l_1 = 1$ m
Length of link 2, $l_2 = 1$ m
With these values, $M_0(q)$, $c_0(q, \dot{q})$, and $G_0(q)$ were calculated.

It is assumed that parameters that define errors of $\Delta M(q)$, $\Delta C_o(q, \dot{q})$, and $\Delta G(q)$ to their nominal values are expressed as follows.

$$\delta_{m1} = 0, \delta_{m2} = \delta_{m3} = \delta_c = \delta_{g1} = \delta_{g2} = -4.0$$

The term of random disturbances applied to the robot, $B_1 \dot{w}(t)$, is expressed as follows.

$B_d = 5I$ (where I is a quadratic unit matrix)

$$\dot{w}(t) = \quad (33)$$

$r(t)/\sqrt{\Delta t}$ (where $r(t)$ is a two-dimensional normal random number)

Assuming the physical parameters of the robot, the initial states of the robot $q_1(0)$, $q_2(0)$, $\dot{q}_1(0)$, and $\dot{q}_2(0)$, and the desired tracks $q_{r1}(t)$ and $q_{r2}(t)$ are expressed as follows.

$q_1(0)=2, q_2(0)=2, \dot{q}_1(0)=0, \dot{q}_2(0)=0$ $q_{r1}(t)=1.5 \cos t + 0.5, q_{r2}(t) = \cos t + 1$ (34)

In addition, the matrix Q that weights the tracking error is a quartic unit matrix as expressed by the following equation (35).

$$Q = \bar{q}I = I, \quad (\bar{q}=1) \tag{35}$$

The robust defining parameter $\gamma$ was determined by experimentation with the following three cases.

$$\gamma=0.2, \quad R=0.01I \tag{1}$$

$$\gamma=0.1, \quad R=0.008I \tag{2}$$

$$\gamma=0.07, \quad R=0.004I \tag{3}$$

Figure 8:
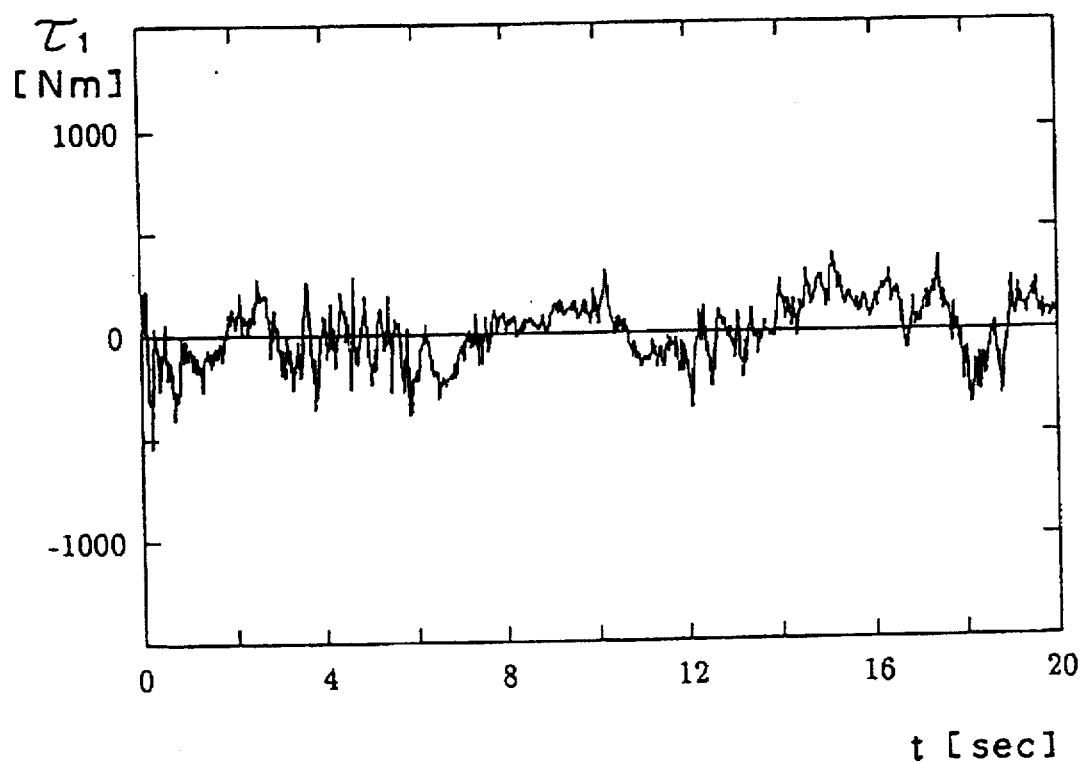
FIG. 8 is a graph showing a control torque $\tau_1$ (t) of a first joint ($\gamma$=0.07)
Figure 9:
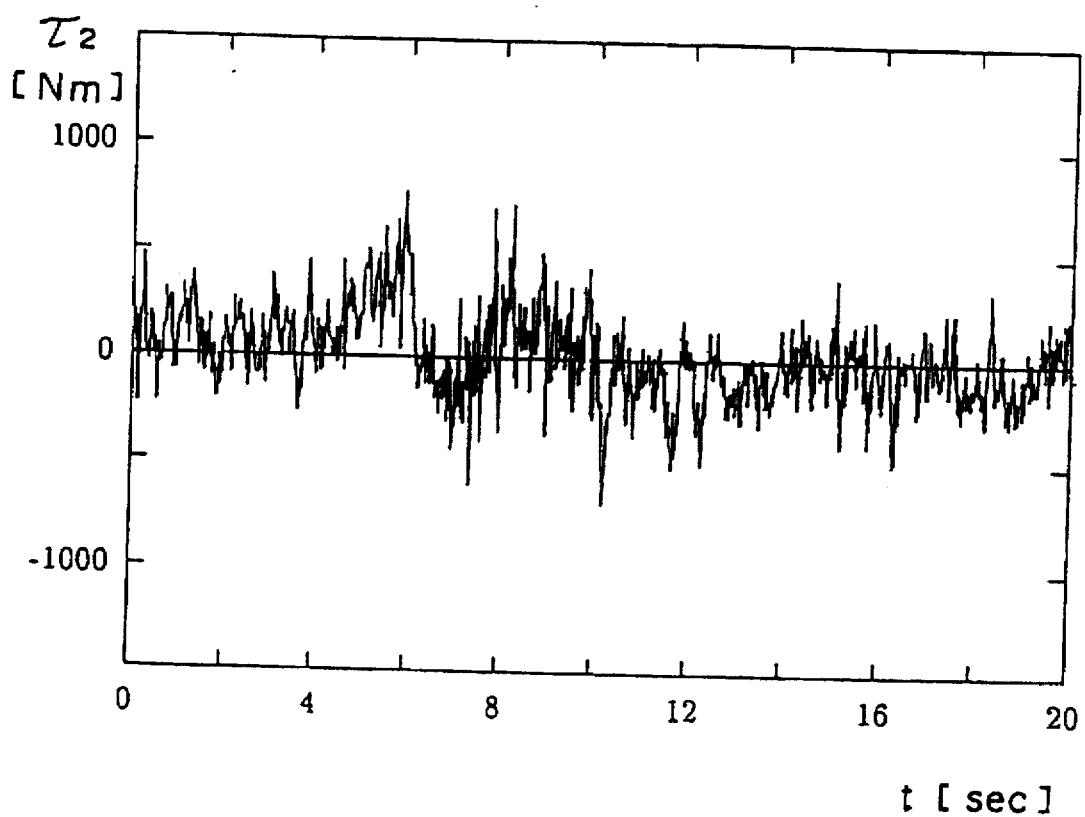
FIG. 9 is a graph showing a control torque $\tau_2$ (t) of a second joint ($\gamma$=0.07)

FIGS. 8 to 11 show simulation results. FIGS. 8 and 9 show the control torques $\tau_1(t)$ and $\tau_2(t)$ of the first joint and the second joint, respectively, in the case that the parameter $\gamma=0.07$.

Figure 10:
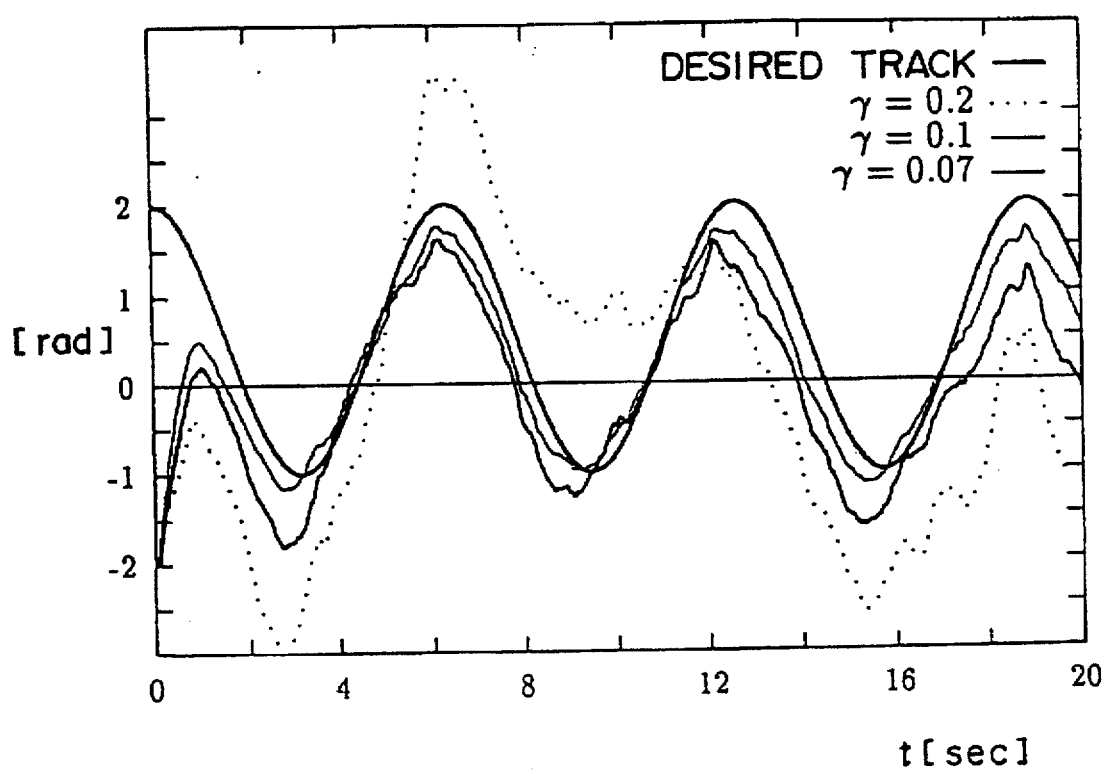
FIG. 10 is a graph showing $q_1(t)$ and desired track $q_{r1}(t)$ of the first joint.
Figure 11:
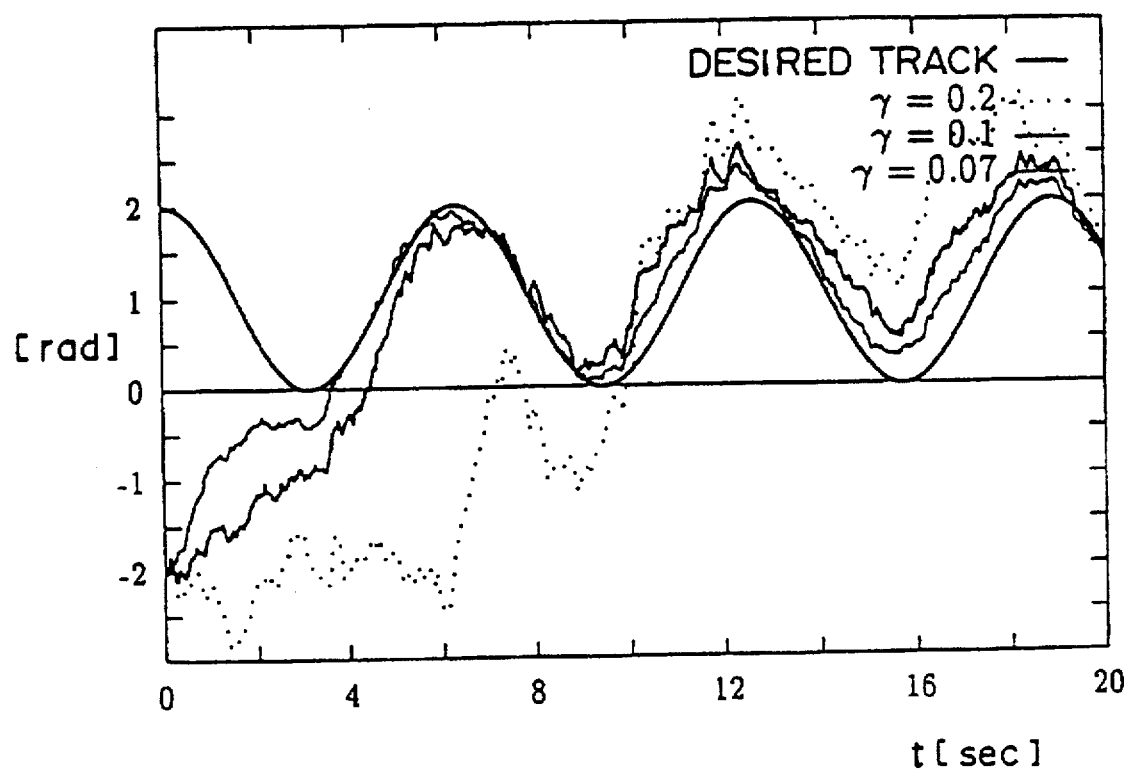
FIG. 11 is a graph showing $q_2(t)$ and desired track $q_{r2}(t)$ of the second joint.

FIG. 10 shows the initial state $q_1(t)$ and the desired track $q_{r1}(t)$ of the first joint corresponding to the combinations of $\gamma$ and R in the cases (1) to (3). FIG. 11 shows the initial state $q_2(t)$ and the desired track $q_{r2}(t)$ of the second joint corresponding to the combinations of $\gamma$ and R in the cases (1) to (3). As the value of $\gamma$ is small, a good tracking accuracy is accomplished. When the value of $\gamma$ is small, the influence of the modeling error to the tracking error and control input error is reduced. The inverse value of $\gamma$ defines the robust characteristic. The simulation results show that when the robust characteristic value is large, the tracking characteristic is improved.

As described above, according to the present invention, when the formulating accuracy of the dynamics model is insufficient, under such bad conditions as when random disturbances such as noise take place, the tracking control of the robot can be more accurately performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A robust control apparatus corresponding to a robust control theory that is a control theory for permitting the use of an imperfect model, comprising:

control model generating means for generating a dynamics model of an object to be controlled in consideration of inaccuracies of coefficient matrices and random disturbances;

partial input optimizing means for optimizing a selective partial input of a control input of the dynamics model corresponding to the state of the object and a robust quadratic optimizing criterion; and control signal generating means for generating a control signal for the object corresponding to outputs of said control model generating means and said partial input optimizing means.

2. The robust control apparatus according to claim 1, wherein said partial input optimizing means is means for optimizing a selective partial input corresponding to the robust quadratic optimizing criterion that is a control criterion for accomplishing a first control scheme for decreasing the sum of the square of the selective partial input and the square of a tracking error, and a second control scheme for decreasing the quotient of which the sum of the square of the selective partial input and the square of the tracking error is divided by the square of a modeling error.

3. The robust control apparatus according to claim 1, wherein said partial input optimizing means is means corresponding to the object control criterion that is a criterion representing that a value including the quotient of which the sum of the square of the selective partial input and the square of the tracking error is divided by the square of a modeling error should be equal to or less than the square of a parameter $\gamma$ defining a robust level.

4. The robust control apparatus according to claim 1, wherein said partial input optimizing means is means corresponding to a stability condition that depends on a parameter $\gamma$ defining a robust level as a stability condition of a control system including said robust control apparatus.

5. The robust control apparatus according to claim 1, further comprising:

first storing means for storing nominal value of a coefficient matrices of a dynamics model generated by said control model generating means.

6. The robust control apparatus according to claim 5, further comprising:

second storing means for storing user designated parameters that are a desired track of the object, a parameter $\gamma$ for restricting a modeling error and defining a robust level, a weighting matrix Q to a tracking error in the control criterion, and a weighting matrix R to a partial input in the control criterion.

7. The robust control apparatus according to claim 6, further comprising:

user designated parameter input means for receiving the user designated parameters from a user and storing them in said second storing means.

8. The robust control apparatus according to claim 6, further comprising:

third storing means for storing a robust quadratic optimizing input function as the robust quadratic optimizing criterion, wherein said partial input optimizing means is means for optimizing the selective partial input according to the state of the object to be input through a sensor and the contents stored in said second storing means and said third storing means.

9. The robust control apparatus according to claim 6, wherein said control signal generating means is means for outputting a control signal to an actuator that generates a control torque for the object according to the output of said partial input optimizing means and the contents stored in said first storing means and said second storing means.

10. The robust control apparatus according to claim 9, wherein said control signal generating means includes the optimized selective partial input at the actuator, and outputs a control signal for generating a standard control torque for a (dynamic) stochastic control system.

11. The robust control apparatus according to claim 1, wherein the object is a multi-joint robot with n joints.

12. The robust control apparatus according to claim 11, wherein the coefficient matrices of the dynamics model of the robot are composed of an inertia matrix with a dimension of n×n, a matrix with a dimension of n×n for defining the influences of Coriolis and centrifugal force, and a column matrix with a dimension of n×1 for defining the influence of gravity.

13. The robust control apparatus according to claim 1, wherein said random disturbances are normal white noise.

14. A robust control method for controlling an object according to a robust control theory, including the steps of:

determining a dynamics model of the object in consideration of both an error between a nominal value of a factor of the dynamics model and a true value thereof, and disturbances that affect the control of the object;

optimizing a selective partial input of a control input for the dynamics model using a robust quadratic optimizing criterion; and generating a control signal for controlling the object according to the dynamics model and the optimized selective partial input.

15. The robust control method according to claim 14, wherein the optimizing step is performed by minimizing the sum of the square of the selective partial input and the square of a tracking error of the object, and minimizing the quotient of which the sum of the square of the selective partial input and the square of the tracking error is divided by the square of a modeling error.

16. The robust control method according to claim 14, wherein the optimizing step is performed by keeping the quotient of which the sum of the square of the selective partial input and the square of the tracking error of the object is divided by the square of a modeling error, to a predetermined value or less.

17. The robust control method according to claim 14, wherein the optimizing step includes determining a stability condition of the object according to a parameter that defines a robust level.

18. The robust control method according to claim 14, further including a step of:

storing nominal values of coefficient matrices of the dynamics model in storing means.

19. The robust control method according to claim 18, further including a step of:

storing a parameter for defining a target track of the object, a parameter for restricting a modeling error of the dynamics model, a parameter for representing a weighting matrix to a tracking error of the track of the object, and a parameter for representing a weighting matrix of the selective partial input as user designated parameters.

20. The robust control method according to claim 19, further including a step of:

receiving the user designated parameters from the user and storing them in storing means.

21. The robust control method according to claim 19, further including a step of:

storing a robust quadratic optimizing input function as the robust quadratic optimizing criterion in storing means, wherein said optimizing step is performed according to the state of the object input through a sensor, the nominal values of the coefficient matrices of the dynamics model, and the user designated parameters.

22. The robust control method according to claim 19, further including a step of:

generating a control signal for an actuator that generates a control torque for the object, according to the optimized partial selective input, the nominal values of the coefficient matrices of the dynamics model, and the user designated parameters.

23. The robust control method according to claim 14, further including a step of: generating a control signal for generating a standard control torque in a (dynamic) stochastic control system for an actuator that generates a control torque for the object according to an optimized partial selective input.

24. The robust control method according to claim 14, wherein the object is a multi-joint robot with n joints.

25. The robust control method according to claim 24, wherein the coefficient matrices of the dynamics model of the robot include an inertia matrix with a dimension of n×n, a vector with a dimension of n for defining the influences of Coriolis and centrifugal force, and a vector with a dimension of n for defining the influence of gravity.

26. The robust control method according to claim 14, wherein the disturbances are normal white noise.

27. A robust control system for controlling an object according to a robust control theory, comprising the object and a control device comprising:

control model generating means for determining a dynamics model of the object in consideration of an error between a nominal value of a factor of the dynamics model and a true value thereof;

partial input optimizing means for optimizing a selective partial input of a control input for the dynamics model using a robust optimizing criterion; and control signal generating means for generating a control signal for controlling the object according to the dynamics model and the optimized selective partial input.

* * * * *